United States Patent [19]

Neumann et al.

[11] Patent Number: 4,761,291

[45] Date of Patent: Aug. 2, 1988

[54] PINEAPPLE PROCESSING METHOD

[75] Inventors: John W. Neumann, Birmingham; J. Scott Neumann, Southfield, both of Mich.

[73] Assignee: Neumann Industries, Incorporated, Madison Heights, Mich.

[21] Appl. No.: 42,972

[22] Filed: Apr. 27, 1987

[51] Int. Cl.⁴ ..................... G01N 33/02; A23L 1/212
[52] U.S. Cl. .................................... 426/231; 426/482; 426/518
[58] Field of Search ................ 426/231, 481, 482, 518

[56] References Cited

U.S. PATENT DOCUMENTS 3,036,920  5/1962  Farmer ................................ 426/482
3,526,162  9/1970  Willcox .............................. 426/518

OTHER PUBLICATIONS

Flow Systems, "The Cutting Edge", vol. II, No. 1, Fall 1985.

*Primary Examiner*—George Yeung
*Attorney, Agent, or Firm*—Lloyd M. Forster

[57] ABSTRACT

Pineapple processing method comprising automatic steps of slicing the raw pineapple, positioning individual slices on conveyor pallets progressing through sequential processing stations for individually scanning each slice, recording an image of each slice based on distinguishing relative transmissivity of edible fruit from unedible shell, flaws such as eyes, and core, using control responsive to recorded image for cutting irregular perimeter path along the boundary line of edible fruit, determining maximum diameter of edible cylindrical slice within the irregular perimeter path for selective size whole slice processing, followed by small piece processing of remaining perimeter of edible fruit.

17 Claims, 1 Drawing Sheet

PINEAPPLE PROCESSING METHOD

BACKGROUND OF THE INVENTION

The present state of the art for processing fresh pineapples is based upon the GINACA MACHINE, invented in 1914. The machine employs two concentric cylindrical knife blades which remove a cylindrical section of the pineapple along its core axis and then removes the butt and crown ends of the cylinder. The cylindrical section of the fruit is next processed by hand to remove any remaining shell, eyes and nectar ducts not removed by the outer Ginaca knife. The cylindrical shape of the removed section of fruit does not correspond to the true natural shape of the pineapple, which is ovoidal or egg shaped, thereby leaving a large amount of high quality solid pack to be recovered as less profitable crushed pineapple or juice.

Attempts have been made to develop a contour peeler whereby the pineapple is rotated about its core axis along a peeler knife to peel the shell by following the outer contour of the fruit. This method was ultimately unsuccessful, however, because the pineapple, especially soft ripened pineapple, could not withstand the mechanical stress.

Some labor and fruit savings have been realized by an attachment to the Ginaca Machine that automatically removes most excess shell left by the Ginaca Machine. This, while an improvement, does not address the basic problem of lost fruit from the mid-section of the pineapple, or the labor intensive hand trimming of the fruit following the Ginaca processing.

SUMMARY OF THE PRESENT INVENTION

The pineapple processing method of the present invention involves certain basic automatic operations:
1. Pineapple is sliced.
2. Each slice is individually automatically scanned to differentiate edible and unedible portions.
3. Pineapple slices are processed individually to recover substantially all edible fruit including the peripheral portion of each slice.

Optional alternative methods and automatic processing equipment as hereinafter referred to may be employed at each operational stage although only one example will be described in this summary.

Previously decrowned fruit enters the slicing unit by a conventional orienter typically found on current versions of the Ginaca Machine. The slicing stages employ mechanisms for accepting, holding, slicing and discharging the fruit which is secured axially by any suitable means such as clamping the fruit on the butt and crown ends with a spike clamp to control rotation of the pineapple about its core axis. Slicing the fruit involves an extremely tough abrasive shell that is relatively difficult to cut and a soft interior that requires a clean smooth cut. In one approach, the outer shell is parted by a series of tangential high pressure water jets. In a second stage, conventional ganged blade knives may be used to complete slicing through the pineapple meat and core.

At an initial inspection station, the face of each slice is inspected by optical instrumentation which stores an image identifying differentially the edible fruit from the relatively darker irregular shell and adjacent eyes to be removed. In the next shell and eye removal stage, the optical density information obtained from previous stage establishes a shell fruit boundary providing a physical map in the memory as to the irregular margin between flaw shell and eyes and edible fruit which stored information is used as input signal to a cutter system that creates a continuous cut, normal to the surface of the slice, and following the shell-eye/fruit boundary. The system may be further enhanced by allowing the controllers to modify the cutter path based on preprogramed statistical knowledge of pineapple slices. Given the detection of an eye, there is a statistical coded maximum depth to which the roots will extend. It is therefore possible to use the detectors to only determine the presence of an eye and allow the controller to determine the depth of the cut. The penalty paid for this modification is a small additional loss of fruit from overcutting shallow eyes.

The cutter is preferably, but not limited to, a water jet system similar to that described in the slicing mechanism section. In addition to the circumferential cut, the controller may direct the cutting mechanism to periodically cut the shell at several points around the periphery of the slice for easy shell removal. These cuts will be perpendicular to the direction of the circumferential cut and will extend from the internal cut through the external surface.

Following the shell/eye removal the pineapple slice will be nearly flaw free but with an irregular periphery. Using maximum depth of cut information from the previous stage, one of various sized cylindrical knives may be selected and used to size the pineapple slice to a standard size. The remaining peripheral fruit will be substantially flaw free and useful for tidbit or chunk product. The mechanism for performing this task may consist of a series of nested standard sized cylindrical knives positioned so that the axis of the knife blade is coincident with the axis of the core of the pineapple slice. Using information obtained from the previous stage, a controller may select the largest diameter knife possible that is within the boundary of the deepest eye removal.

DETAILED DESCRIPTION OF PREFERRED AND ALTERNATIVE METHOD STEPS

The fundamental key feature of the present pineapple processing method is to initially slice the pineapple and then remove the shell and blemishes around the perimeter of each individual slice recovering substantially all edible fruit for subsequent processing as compared to the prior art Ginaca system of cutting a solid cylinder of fruit from the interior of the pineapple which, due to the ovoidal or egg shape typical pineapple configuration, inherently leaves a substantial edible portion of the pineapple unrecovered for optimum use in consumption.

Figure 1:
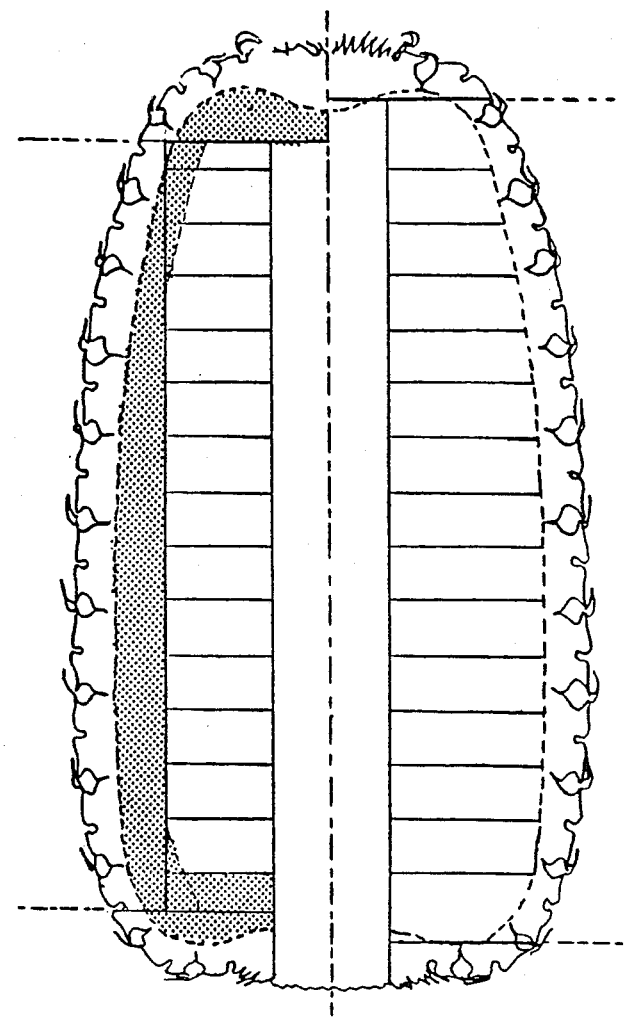
FIG. 1 is a schematic sectional view of a typical pineapple illustrating shell, slice and core areas.
Figure 2:
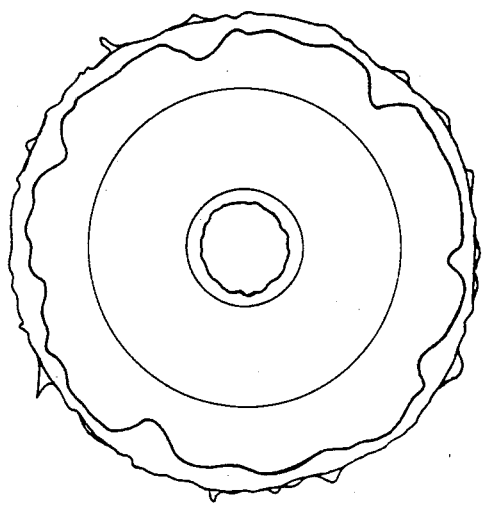
FIG. 2 is a Xerox copy of a photographic reproduction of a system processed image of a typical pineapple slice.

The cross sectional view of FIG. 1 illustrates on the left side of the center line, in dotted section, the edible portion of a typical pineapple which is unrecovered within the cylindrical section of conventional Ginaca processing as compared with the recovery potential from slices individually processed to remove the outer shell and eyes. FIG. 2 illustrates, in a Xerographic reproduction of an actual photograph, the surface of a typical pineapple slice in which the irregular peripheral demarkation between the shell and inwardly projecting eyes and the edible interior fruit is shown by an irregular peripheral cutting path developed by optical differential transmissivity which applicants' method is directed to follow. Concentric circles superimposed on the photographic reproduction illustrate the boundaries of a typical Ginaca cylinder which, particularly in a center slice as shown, leaves more than half of the edible fruit unrecovered by the central cylinder.

A preferred method of initial slicing is by means of a single pass of the entire pineapple, with only the crown and optionally butt ends removed, through a rotary blade slicer having slitting blades spaced at the required thickness. Continuously sharpened knife edges enable penetration of the relatively tough pineapple shell as well as smooth cutting of the tender fruit and somewhat tougher core.

Optionally two stage slicing may be employed with carbide teeth circular blades, or tangential water jets, following the contour of the pineapple shell rotatably mounted on axial centers adapted to establish circular slice paths through the thickness of the shell. Conventional slitting blades may then be employed to complete the slicing with prolonged durability relative to sharpening.

Where the outer shell is slit by a series of parallel high pressure water jets spaced at the desired slice thickness, standard cutting jets with a 0.006–0.010" diameter orifice and 20,000 to 50,000 psi operating pressure may be used. The jets are positioned tangentially to the pineapple surface each in a plane normal to the core axis so that as the pineapple is rotated about its core axis a series of parallel circumferential cuts are made deep enough, but no deeper than the thickness of the shell. Care must be provided not to cut too deeply into the meat of the pineapple as the water jet will tear the fruit leaving an unacceptable surface on the face of the pineapple slice. As another alternative to the two-step slice process, a blade in the shape of Archemede's spiral may be used to slice the fruit by placing teeth on the small radius surface of the spiral and a sharp smooth blade on the rest of the spiral. The tough part of the shell may be cut with a serrated or toothed knife and the meat of the fruit cut with a smooth blade. Such Archemede's spiral shape also minimizes mechanical stress on the fruit and the blade could be fastened on a single knife cutter in an apparatus similar to that described in U.S. Pat. No. 3,485,277.

Following any method of slicing, pineapple slices are thereupon separated and individually centrally positioned by suitable automatic means on individual pallets with indexable horizontal chain conveyor adapted to move to and through successive processing stations.

INITIAL INSPECTION

So as to avoid processing diseased, damaged, missliced or otherwise unacceptable fruit, an initial inspection is performed. Any slice that contains no salvagable fruit will be automatically discarded so as not to waste machine resources processing unacceptable product. Also, to avoid repeating similar optical devices at later stations, it is desirable to include shell and eye detection at this stage. Shell, eyes, green discoloration, butts and crowns may be detected by measuring the optical characteristics of a slice while other attributes such as hard white fruit and diseases will require special detective mechanisms. For example, Pink's disease is indicated by a brown discloration of the fruit when heated. A possible detector would consist of a power LASER irradiating a spot on the surface of the slice, such as the core, until it reaches a temperature great enough so that a diseased fruit would discolor. A photo detector measuring reflected white light would indicate a diseased slice. Similarly, hard or woody, white fruit is indicated by fluorescence under exposure to the U-V light. As many disease detector schemes as appropriate may be incorporated at this stage.

Detection of the shell and eyes is accomplished by measuring the optical transmissivity of the slice at various surface locations. This is possible because both the shell and the eyes are dense compared to the meat of the slice, and hence, will transmit a much smaller portion of the incident light. In one embodiment, one surface of the slice of pineapple is illuminated with white light of a specific wavelength or a combination of wavelengths, then detected on the opposite side by a radial array of optical detectors such as photo diodes. The signal detected by each photo diode is then compared to a reference signal determining the presence or absence of a flaw (shell or eye). A positive signal, one indicating a flaw, is spatially referenced to its location on the surface of the slice by encoding the angle through which the slice has been rotated and by which detector along the radius indicated the flaw.

For maximum sensitivity, while retaining a large margin of noise immunity, it is desirable to use a floating reference signal, or one that is generated for, and is unique to, each slice. This is accomplished by using a two-pass process. A reference generation pass and a flaw detection pass. On the first scan across the surface of the slice the detector outputs from the center of the array (the part of the array that assumably passes over the flaw free fruit) are averaged with each other and time averaged over the duration of the scan. The resulting signal is then used as the reference with which to compare the detector outputs of the second flaw detection pass. This reference signal is also used for the additional purpose of determining the overall quality of the slice. By comparing the slice reference signal with a standard reference level, slices that do not meet minimum translucency criteria can be immediately rejected. Examples of slices that will not meet this criteria are butt and crown slices, heavily bruised or discolored slices and extremely dense woody slices. The information obtained from the detection scan (the output state of the comparators and the angle information from the position encoder) is stored in digital memory for later use by the flaw removal system.

SHELL AND EYE REMOVAL

As indicated in the foregoing summary, the next stage in the present system removes the shell and the eyes from each slice. Using the optical density information obtained in the previous stage, a shell fruit boundary can be determined. In the previous stage, each comparator output (one for each detector) and the output of the position encoder was stored in digital memory. A physical map therefore exists in the memory as to the presence or absence of a flaw. An encoder is used to generate memory addresses, while the detector outputs generate the density information. This stored information is then used as the input signal to a cutter system that creates a continuous cut, normal to the surface of the slice, and following the shell-eye/fruit boundary. Since the detector radial position maps to a unique bit position in the data word, the distribution of ones and zeros in a data word may be used to radially control the position of the cutter. The angular position of the cutter is also reproduced by positioning the slice so that the encoder output matches the memory address. In other words, each angular position has a unique address associated with it that matches the digital memory address where the detector outputs are stored. By examining each word in memory, the proper position of the cutter is easily determined for that angular position. This is accomplished by examining the outer most bit and moving inward. If a zero is encountered first, then a one, the outside shell boundary is indicated. Moving inward, a one to zero transition indicates shell-eye/fruit boundary, then continuing to move inward, a zero to one transition indicates the fruit core boundary. Allowing the controller to position the slice at any of its angular positions and to position the cutter mechanism at any of the radial positions of the detectors gives the controller the ability to make a circumferential cut normal to the surface of the slice which follows the shell-eye/fruit boundaries. The resulting slice will have an irregularly shaped periphery, have no shell attached and have most, but not all, of each eye removed. The problem with using this system to fully remove the eye is that it is very difficult using this detection scheme to detect the tiny nectar ducts attached to the interior of each eye. Therefore, the bulk of the eye will be removed but the roots or nectar ducts will remain.

The cutter is preferably, but not limited to, a water jet system similar to that described in the slicing mechanism section. For example, a laser, abrasive wire or other cutting means may be employed in an alternative cutter mechanism. The water jet is a standard industrial cutting jet nozzle with a 0.008" to 0.01" orifice operating at 20,000 to 50,000 psi. This nozzle is connected to its water supply by a flexible coupling and is mounted on a support so that the jet stream is normal to the surface of the slice. The nozzle orifice is $\frac{1}{8}''$ to $\frac{1}{4}''$ above the surface of the slice, and has one degree of freedom in the radial direction. The radial motion is driven by a linear stepper motor that is linked to the system controller through a digital to analog converter and a power amplifier. Angular position is determined either by rotation of the slice or rotation of the cutter mechanism about the core axis of the slice. In either case, angular position is driven by a rotational step per motor linked to the system controller through a digital to syncro converter and a power amplifier.

An alternative eye detection method exists that considerably reduces the burden on the optical detection system. In this method the cutter system only removes the outermost green portion of the shell. This exposes the dark eyes against a very white background facilitating optical detection. The slice may then be processed as before where the cutter system controller assumes a maximum depth for the eyes as it removes the remainder of the shell and the eyes. This method has the disadvantages of increased processing time, two cutter passes rather than one, and the inclusion of additional optics at the cutter station.

In another optional modification, realtime scanning together with shell and eye removal may be performed at a single station by using relative transmissivity immediately ahead to control the path of the water jet adapted to adjust radially while the slice is rotating below.

Each pallet is preferably constructed with a rotatable center plate having a central prong or prongs for at least locating the center core of the slice, and optionally with means for retaining the angular position of the slice depending on the need for successive processing operations as where an electro-optical image of each slice taken at an initial station is retained and used at a subsequent station where the image is employed in trimming the shell and eyes.

RESIDUAL FLAW DETECTION AND REMOVAL

In order to assure that the final product is flaw free, a second flaw detection and removal station may be included. This station is primarily designed to detect and remove any remaining portions of the eye nectar ducts that may have been missed during the previous processing. The flaw that must be detected is known as a triad and may be as small as 0.010", it will be dark brown in color and will be on the edge of the pineapple slice.

To reliably detect a triad at the processing speeds required, a two-color detector system is employed. Research has shown that a spectral analysis of white light reflected off typical pineapple flesh (including: ripeyellow, non-ripened white, and translucent flesh) reveals a relatively flat spectral response between the wavelengths of 550 nm and 825 nm. The spectral response of a triad (brown) however, has a much lower reflectivity in the 550 nm to 700 nm range and a higher reflectivity in the 750 nm to 900 nm range relative to typical pineapple flesh. Using this information, a triad is easily detected by illuminating the fruit with white light (flat between 500-900 nm) and using a two-detector system employing narrow band filtering to monitor the light reflected from the surface. The detectors are filtered so that one responds to a narrow band width centered at 600 nm (visible) and the other centered at 852.1 nm (IR). Upon detection of a triad, the response from the visible band detector will drop and the response from the (IR) band detector will increase relative to the reflection from the normal fruit background. The filtered light is projected onto of an array of diodes so that a vertical position of the flaw on the edge of the slice may be resolved.

Similar to the optical detection previously described, angular position is divided into a discrete number of positions with a unique digital output for each position. The controller steps the pineapple slice through each angular position. At each position the detector (comparator) outputs are inspected to determine whether a flaw exists. If a flaw is detected, its angular and vertical positions are stored until the slice has rotated through an angle of "x" degrees. At this position, the controller will convert the detector position that detected the flaw (vertical position of the flaw) into a signal to position the Galvinometer, and hence the mirror, so that a LASER will be focused on the flaw. The LASER is then pulsed and the flaw is removed. The pineapple slice will continue this process rotating as many times as required to remove all flaws. In most cases one revolution will be sufficient. However, if a detected flaw is larger than the amount of material removed by the LASER, the remaining portion will be picked up on subsequent revolutions.

This system is not limited to LASER flaw removal. A variety of mechanical flaw removal systems have been

FINAL INSPECTION, SORTING AND MODIFICATION

Each of the slices entering the final inspection station should be a flaw-free product. Each slice will, however, vary in at least diameter, color, sugar content, pH, and salinity. The purpose of this station is to sort the slices according to these parameters or, where possible and appropriate, modify the parameter to produce a more uniform product. Several pieces of information associated with each slice and useful at this station will have been stored in the host computer during prior processing. This information, at a minimum, is the diameter of the slice and its position in the original fruit. Several additional detectors may also be employed to complete the information on each slice. These detectors could possibly include pH, color, sugar, and salinity monitors. Information from these monitors will determine whether it is appropriate to modify any of the said parameters and in determining whether the product will be packaged as fancy or choice or any other appropriate classification.

We claim:

1. Pineapple processing method comprising the steps of slicing a pineapple having a peripheral edible fruit and unedible shell and eyes, sensing each slice by a sensing device for its peripheral extremity of edible fruit, and differentially processing each individual slice by automatically controlled means responsive to said sensing step, to remove the shell and eyes and recover the fruit including any edible peripheral portion of each slice.

2. The method of claim 1 wherein the sensing step includes optically sensing the condition of each slice to identify the edible fruit in effecting recovery by said automatically controlled means.

3. The method of claim 2 wherein the step of optically sensing senses the relative transmissivity between edible fruit to be recovered and unedible portions of each slice.

4. The method of claim 2 wherein the step of optically sensing senses the relative transmissivity between edible fruit to be recovered and unedible shell and eyes of each slice.

5. The method of claim 2 wherein the step of optically sensing senses the relative transmissivity between edible fruit to be recovered and unedible shell and eyes of each slice, and including the step of employing a cutting means to trim the shell and eyes from the edible peripheral portion of each slice.

6. The method of claim 5 including the step of directing said cutting means along an irregular peripheral path forming a line of demarkation for the edible peripheral portion of each slice.

7. The method of claim 6 including differential response to said relative transmissivity between fruit and eye to effect a radially inward path around each eye.

8. The method of claim 6 including the employment of a programmed standard V-notch path to exclude each eye encountered in the periphery from said edible peripheral portion.

9. The method of claim 4 including the step of forming an electro-optical memory image of said optical sensing of each slice to be employed at a subsequent step of processing, and the step of differentially responding to the relative transmissivity of said memory image in said automatically controlled means.

10. The method of claim 6 including simultaneous sensing of said relative transmissivity and simultaneously directing said cutting means along said irregular peripheral path.

11. The method of claim 10 including the step of rotating each individual slice with its periphery under said cutting means, and reciprocating said cutting means radially while said slice is rotating to follow said irregular peripheral path in response to said optical sensing of relative transmissivity.

12. The method of claim 7 including the steps of detecting and recording the innermost radial boundary of said irregular path to determine the diametrical grading of the recovered slice of fruit, and effecting cylindrical cutting of said slice together with the removal of a cylindrical core preparatory to canning cylindrical slices.

13. The method of claim 12 including the step of cutting the remaining edible periphery of said fruit into edible pieces for subsequent canning.

14. The method of claim 8 including the steps of detecting and recording the innermost radial boundary of said irregular path to determine the diametrical grading of the recovered slice of fruit, and effecting cylindrical cutting of said slice together with the removal of a cylindrical core preparatory to canning cylindrical slices.

15. The method of claim 14 including the step of cutting the remaining edible periphery of said fruit into edible pieces for subsequent canning.

16. The method of claim 5 including the step of employing a water jet as the cutting means.

17. The method of claim 5 including the further step of sensing the edge of each slice for remaining flaws, and automatically removing said flaws.

* * * * *